3,384,601
Patented May 21, 1968

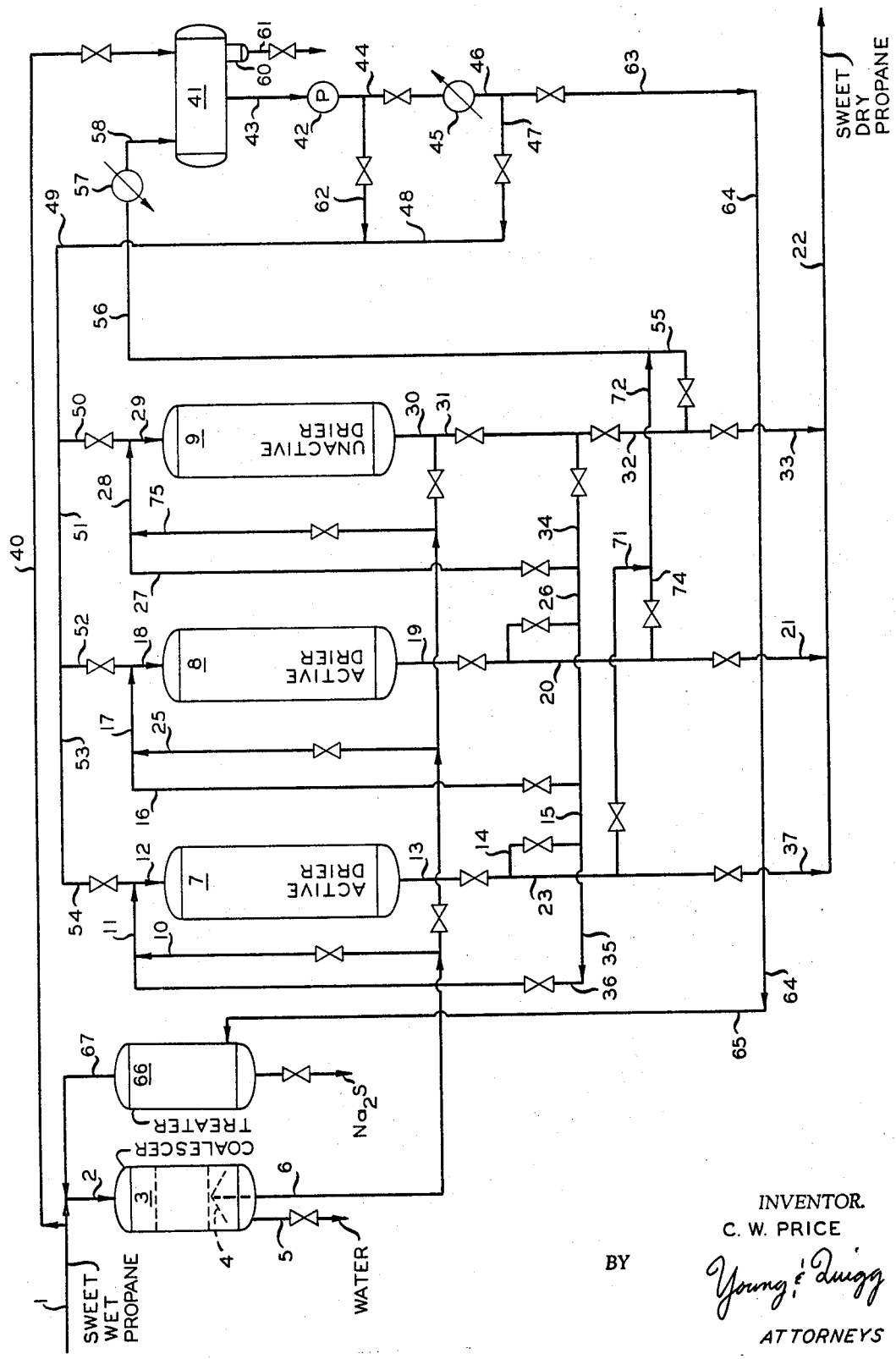

1

3,384,601
METHOD FOR REGENERATING A DESICCANT TO PREVENT $H_2S$ CONTAMINATION OF THE HYDROCARBON FEED
Clifford W. Price, Bartlesville, Okla., assignor to Phillips Petroleum Company, a corporation of Delaware
Filed Dec. 28, 1964, Ser. No. 421,222
2 Claims. (Cl. 252—412)

ABSTRACT OF THE DISCLOSURE

In a hydrocarbon drying process, using a plurality of drying zones, one of which is undergoing regeneration using vaporous feed, the vaporous feed after regeneration is treated to separate out sulphur containing compounds and added to the feed hydrocarbon for the system, thereafter the regenerated zone is cooled using cool hydrocarbon feed to avoid additional generation of sulfur containing compounds.

---

This invention relates to a method and apparatus for dehydrating a hydrocarbon material.

It is often desirable to remove water from a hydrocarbon material to reduce the corrosive potential of that material; however, in systems utilized to dry hydrocarbons, desiccants are often employed which require periodic regeneration by contacting with a regeneration material and which during such regeneration decompose sulfur compounds present in the regenerating material and form hydrogen sulfide. Since the regenerating material is generally a heated, wet hydrocarbon which is the same as the hydrocarbon to be dried by the desiccant, hydrogen sulfide formed during the regeneration process, which also has high corrosion potential, ultimately is returned to the main stream of material being dried, thereby turning up in the final dried hydrocarbon product.

Heretofore the regenerating material, having the high hydrogen sulfide content, i.e., at least 40 parts per million hydrogen sulfide, was not returned to the main stream of material being dried but was utilized as fuel or simply flared. Thus, the amount of wet hydrocarbon utilized as the regenerating material was lost which added significantly to the cost of the operation since the amount of hydrocarbon lost reduced the amount of dried product recovered from the system.

It has now been found that a dry hydrocarbon product containing no more than 2 parts per million hydrogen sulfide can be produced with substantially no loss of hydrocarbon in the manner described above if at least 95 volume percent of the wet hydrocarbon used for regeneration and heretofore discarded is passed first through a treating zone to remove hydrogen sulfide then together with the main stream of material to be dried through a coalescing zone and finally through at least one active drying zone containing active desiccant to remove the water therefrom.

Accordingly, it is an object of this invention to provide a new and improved method of drying wet hydrocarbon material. It is another object of this invention to provide apparatus for drying wet hydrocarbon material.

Other aspects, objects and the several advantages of the invention will be readily apparent to those skilled in the art from the description, the drawing and the appended claims.

The drawing shows diagrammatically a system embodying this invention.

In the drawing, propane that is wet, i.e., containing at least 5 parts per million water, and sweet, i.e., containing less than 2 parts per million hydrogen sulfide, is

2 passed by 1 and 2 to coalescer 3 wherein any entrained water is separated from the propane by coalescing means comprising packing and a domed element 4. Water is removed by valved line 5 for disposition as desired.

The sweet, wet propane is removed from coalescer 3 by 6 and passes into any one of dryers 7, 8 and 9. Dryers 7, 8 and 9 are connected one to the other and to other apparatus in the system as described in detail below in a manner such that two or more can be operated in series and/or in parallel. For purposes of description the system will be defined in detail when, as is the general case, two dryers are active and therefore being utilized to remove water from the propane effluent in 6 from coalescer 3 while the third dryer having been rendered inactive by prior contact with wet propane from 6 is regenerated. Thus, as in the drawing, dryers 7 and 8 are active and being employed in series while dryer 9 is being regenerated. As stated above, when dryer 9 has been regenerated then it will be placed in series with dryer 8, dryer 8 being the first of the series, and dryer 7 will be regenerated since it was the first of the series of dryers 7 and 8.

Thus, the sweet, wet propane in 6 passes into valved line 10, line 11 and line 12 into active dryer 7. The sweet and somewhat dehydrated propane passes from dryer 7 through valved line 13, valved line 14, line 15, valved line 16, lines 17 and 18 through active dryer 8. The sweet, dry propane from active dryer 8 passes through valved lines 19, 20 and 21 into line 22 which removes same from the system as the sweet, dry propane product thereof. Similarly, a sweet, wet propane in 6 instead of passing into line 10 and dryer 7 can pass into valved line 25, line 17 and line 18, dryer 8 and from there through valved line 19, line 26, valved line 27, line 28 and line 29 through dryer 9. The sweet, dry propane from dryer 9 then passes by line 30, valved line 31, line 32 and line 33 into line 22 and out of the system as the product thereof. Also, the sweet, wet propane in 6 can first pass through valved line 75, line 28, line 29 into dryer 9 and thereafter through line 30, valved line 31, valved line 34, line 26 into valved lines 16, 17 and 18 and ultimately into dryer 8 or into lines 15, 35, 36, 11 and 12 and ultimately into dryer 7. When dryer 7 is the last active dryer in the series the sweet, dry propane product passes to line 22 through valved lines 12, 23 and 37. When dryer 8 is the last dryer of the active series the sweet, dry propane product passes to line 22 through valved lines 19, 20 and 21.

An amount of sweet, wet propane necessary to form the vapors to begin regeneration of inactive dryer 9 is removed from 1 by valved line 40 and passed to accumulator 41. When the regeneration of dryer 9 is initiated pump 42 moves sweet, wet propane from accumulator 41 through line 43 and valved line 44 into heater 45, which is maintained at a temperature sufficient to substantially completely vaporize all the propane passed thereinto by valved line 44. Vaporous propane then passes through 46, valved lines 47, 48, 59, 50 and 29 into dryer 9. Similarly, if either dryer 7 or dryer 8 should need to be regenerated vaporous propane passes from line 49 through line 51 into valved line 52, line 18 and dryer 8 or through 53 into valved line 54, line 12 and dryer 7. Dryer 9 is left full of sweet, wet propane when it is removed from the active dryer series to be regenerated. The propane vapors entering dryer 9 through valved line 50 and line 29 force this sweet, wet liquid propane out of dryer 9 through line 30, valved lines 31 and 32 into valved line 55. From valved line 55 the propane moves through line 56 and cooler 57 to line 58 and into accumulator 41. Propane vapors are continuously circulated through dryer 9, condensed in cooler 57, collected in accumulator 41 and revaporized in heater 45 until 400° F. propane vapors entering dryer 9 through line 29 leave dryer 9 through line 30 at a temperature of about 375° F. at which time the heating phase of the regeneration operation is complete and the flow of vapors to dryer 9 through line 29 is stopped thereby leaving the desiccant in dryer 9 in a heated state of a temperature between 375 and 400° F. and dryer 9 is left full of vaporous propane.

Due to a catalytic effect, not completly understood, sulfur compounds present in the sweet, wet propane vapors passed through dryer 9 are converted from, for example, a mercaptan to hydrogen sulfide which hydrogen sulfide is carried out of dryer 9 with the vaporous propane and condensed by cooler 57 and collected in accumulator 41. Thus, after the heating phase of the regeneration operation, except for the vapors left in dryer 9 substantially all of the wet propane utilized to form vapor and regenerate the desiccant in dryer 9 is collected in accumulator 41 and has high hydrogen sulfide content, i.e., at least 10 parts per million. The water removed from the desiccant in dryer 9 by the propane vapors is also condensed by cooler 57 and is separated from the condensed propane in accumulator 41 by water leg 60 which water is removed by valved line 61 as desired. However, the hydrogen sulfide associated with the condensed propane in accumulator 41 is removed by passing the liquid propane from 41 through line 43, valved line 62, line 48, valved line 47, thereby by-passing heater 45, valved line 63, line 64 and line 65 into caustic treater 66. In caustic treater 66 the liquid propane is contacted with an aqueous solution of sodium hydroxide and the hydrogen sulfide removed from the liquid propane in the form of sodium sulfide. The thus hydrogen sulfide-purified propane is removed from caustic treater 66 and passed by 67 into line 2 to be dehydrated and removed from the system by line 22 as the sweet, dry propane product. The amount of hydrogen sulfide-containing propane removed from accumulator 41 should be at least 95 volume percent of the propane that was utilized to form vapors to be passed through dryer 9, condensed by cooler 57 and collected by accumulator 41 for revaporization.

After at least 95 volume percent of the hydrogen sulfide-containing propane is removed from accumulator 41 substantially the same amount of sweet, wet propane is added to accumulator 41 from line 1 by valved line 40. After this is done the sweet, wet propane in accumulator 41 which is at a temperature substantially below that of the desiccant in dryer 9, due to the contacting of the desiccant with vaporous propane, i.e., propane at a temperature of about 85° F., is removed from accumulator 41 by pump 42 through line 43, valved line 62, line 49, valved line 50 and line 29 into dryer 9. Sweet, wet vaporous and liquid propane passes from dryer 9 through line 30, valved line 31, line 32, valved line 55 and line 56 into cooler 57 wherein vaporous propane is condensed and the sweet, wet liquid propane then passes by 58 into accumulator 41 for recirculation to dryer 9 until that dryer is reduced in temperature to about 100° F.

When dryer 9 is reduced to the desired operation temperature, the flow of sweet, wet propane thereto through line 29 is stopped and dryer 9 is left substantially full of sweet, wet liquid propane.

After completing the regeneration of dryer 9, regeneration of dryer 7 is initiated and dryer 9 is employed as the dehydrating tower in series with dryer 8. Thus, the flow of vaporous propane is from heater 45 through lines 46, 47, 48, 49, 51, 53, 54 and 12 into dryer 7 and returned from dryer 7 through lines 13, 23, 71, 72 and 56 into cooler 57 and then through line 58 into accumulator 41. After the regeneration of dryer 7 it is placed into series with dryer 9 and dryer 8 is reactivated by passing vaporous propane thereto through lines 51, 52 and 18 and then returned to accumulator 41 by passing through lines 19, 20, 74, 72 and 56 into cooler 57 and then through 58 to accumulator 41.

Thus, sweet, wet propane having a hydrogen sulfide content of substantially less than 2 parts per million enters the system through 1 and a sweet, dry propane product having a hydrogen sulfide content of less than 2 parts per million leaves the system as the product thereof through line 22. Further, in the system at least one dryer is regenerated, the hydrogen sulfide formed during the regeneration process is removed with substantially no loss of the propane, which contains hydrogen sulfide formed during the regeneration process, thereby providing a very efficient closed-circuit system which is significantly more economical than those systems known heretofore in that the loss of propane utilized in the regeneration operation is substantially completely eliminated without increasing the hydrogen sulfide content of the propane product of the system.

Generally, the system of this invention is applicable to any hydrocarbon material which can be dehydrated with known desiccants and which can have hydrogen sulfide removed therefrom by conventional caustic or other treatment. However, preferred hydrocarbons are those containing from 2 to 10 carbon atoms per molecule.

This invention applies to any desiccant known in the art which catalytically decomposes sulfur compounds in the hydrocarbon under regeneration conditions to hydrogen sulfide. Such desiccants include activated alumina, silica gel, activated carbon and the like.

Any conventional treatment known in the art can be utilized in place of caustic treater 66 of the drawing. The only requirement of caustic treater 66 or any substitute operation is that the hydrogen sulfide, associated with the propane removed from the accumulator 41, after the heating phase of the regeneration operation, is substantially completely removed. Generally, the hydrogen sulfide concentration of the treated propane should be low enough so that the hydrogen sulfide concentration in the final product in line 22 will not exceed 2 parts per million. Caustic treatment operations for the removal of hydrogen sulfide from hydrocarbon materials are known and no further details appear to be necessary other than a statement that what is generally desired to be employed in caustic treater 66 are strongly alkaline reagents such as solutions of caustic soda and the like. However, any method of removing the hydrogen sulfide can be used, such as scrubbing with water or an aqueous amine solution.

The operating conditions for the system as a whole will vary to a large extent based upon the type of hydrocarbon employed and the water and sulfur compound content thereof as well as the maximum water and hydrogen sulfide content which can be tolerated in the sweet, dry propane product of the system. However, generally, the hydrocarbon feed through line 1 will be at a temperature in the range of from about 50 to 100° F. and the sweet, dry hydrocarbon product of the system will be in the same temperature range. The temperature of the vaporous hydrocarbon used in the heating phase of the regeneration operation will also vary widely depending upon the type of hydrocarbon employed and the type of desiccant present. Generally, it is sufficient if the hydrocarbon is heated to the point where it is substantially completely vaporous, preferably superheated vapor, and is passed through the dryer to be regenerated until the temperature drop between the vaporous hydrocarbon passing into the dryer and the vaporous hydrocarbon passing out of the dryer is no more than about 75° F. The temperature of the sweet, wet propane passed through the dryer after the heating phase of the regeneration operation to cool the dryer and desiccant therein can simply be that of the sweet, wet hydrocarbon passing through line 1, i.e., at a temperature in the range of from about 50 to 100° F. However, if desired, the hydrocarbon employed to cool the heated, regenerated desiccant can exceed or, preferably, be below the range of from 50 to 100° F. since all that is necessary is that the heated desiccant of the regenerated dryer be cooled into its operating temperature range for dehydration of the sweet, wet hydrocarbon passing therethrough which operating range generally approximates the temperature of the sweet, wet hydrocarbon passing therethrough. The temperature of cooler 57 need be only that sufficient to substantially completely condense the vaporous hydrocarbon passing therethrough and will also vary depending upon the type of hydrocarbon and the amount thereof. Generally, cooler 57 need only produce an effluent on the order of about 100° F.

Example

Propane containing 243 p.p.m., water and less than 2 p.p.m hydrogen sulfide is passed at a rate of 6600 barrels per day and at a temperature of about 85° F. to coalescer 3. The effluent from coalescer 3 is passed serially through two dryers 3 feet in diameter and 10½ feet in height substantially full of particulate activated alumina desiccant. Propane having less than 2 p.p.m. hydrogen sulfide and substantially no water is removed from the second of the series of two dryers as the sweet, dry propane product of the system.

To regenerate the activated alumina desiccant in a single dryer, accumulator 41 contains approximately 2 to 3 barrels of sweet, wet propane at a temperature of about 85° F. Propane is withdrawn from accumulator 41, vaporized and heated to a temperature of about 400° F. and continuously passed into the dryer to be regenerated, e.g., dryer 9. The liquid and vapor effluent from dryer 9 is cooled and condensed to a temperature of about 100° F. and passed to accumulator 41 to be revaporized and heated to about 400° F. and passed through dryer 9, recondensed and reaccumulated until vapor is passed into dryer 9 at a temperature of 400° F. and removed from dryer 9 at a temperature of about 375° F., at which time circulation of propane vapor through dryer 9 is terminated.

Propane utilized as vapor in regenerating dryer 9 is condensed and collected in accumulator 41 and has a hydrogen sulfide content of about 40 p.p.m. This propane is removed in an amount of about 97 volume percent and passed through a caustic treater containing a strongly alkaline solution containing 10 weight percent sodium hydroxide at a temperature of about 85° F. The propane effluent of the caustic treatment has a hydrogen sulfide content of less than 2 p.p.m. and is passed to coalescer 3 to be dried and passed from the system as part of the sweet, dry propane product thereof.

After removal from accumulator 41 of the propane containing 40 p.p.m. hydrogen sulfide about 10 barrels of sweet, wet propane from line 1 is added to accumulator 41 at a temperature of about 85° F. This propane is then removed from accumulator 41 and passed into heated, vaporous propane containing dryer 9. The effluent from dryer 9 is cooled and/or condensed by cooler 57 to a temperature of about 100° F. and returned to accumlator 41. The propane is recycled through dryer 9 continuously until the temperature of the propane passing out of dryer 9 approximately equals the temperature of the propane, i.e., 100° F., passing into dryer 9 at which time circulation is terminated and dryer 9 is left substantially full of the propane used to cool it. The rate of flow of regenerating vaporous propane and cooling propane through dryer 9 is approximately 13 gallons per minute and requires approximately 4 hours of circulation of vaporous propane and 3 hours of circulation of cool propane to complete the regeneration operation.

Thus, from the 6600 barrels of sweet, wet propane substantially all of the propane present is removed from the system as a sweet, dry product thereof notwithstanding the fact that regeneration of the dryers of the system continuously takes place utilizing some of the sweet, wet propane that passes through that system.

Reasonable variations and modifications are possible within the scope of this disclosure without departing from the spirit and scope of the invention.

I claim:
1. A method for regenerating a desiccant which is active primarily for water removal and which decomposes sulfur compounds to form hydrogen sulfide during its regeneration, which method comprises passing a wet hydrocarbon containing less than 2 parts per million hydrogen sulfide through a heating zone and therein vaporizing substantially all of said wet hydrocarbon, passing said vaporous wet hydrocarbon into contact with said desiccant to be regenerated, removing and cooling the effluent from said contacting step, passing the cooled effluent into a settling zone to separate water from the cooled effluent, repeating said steps of vaporizing, contacting with said desiccant, and cooling until regeneration of said desiccant is completed, passing at least a portion of said cooled effluent from said settling zone to a treating zone after the regeneration of said desiccant is completed to remove sulfur compounds formed during the regeneration steps, and passing another portion of wet hydrocarbon through said regenerated desiccant to reduce the temperature substantially to the normal operating temperature of said desiccant.

2. The method of claim 1 in which said desiccant is activated alumina.

References Cited

UNITED STATES PATENTS

| | | | |
|---|---|---|---|
| 2,570,974 | 10/1951 | Neuhart | 252—411 |
| 2,665,769 | 1/1954 | Walker et al. | 55—21 |
| 2,761,755 | 9/1956 | Brown | 208—229 X |
| 2,906,793 | 9/1959 | Rowe et al. | 252—411 |
| 3,085,380 | 4/1963 | Dillman et al. | 55—73 X |

DELBERT E. GANTZ, *Primary Examiner.*

PAUL M. COUGHLAN, JR., *Examiner.*

R. H. SHUBERT, GEORGE J. CRASANAKIS,
*Assistant Examiners.*